United States Patent
Tamaoki (10) Patent No.: US 7,706,055 B2
(45) Date of Patent: Apr. 27, 2010

(54) OPTICAL MODULE AND PROCESSING METHOD

(75) Inventor: Shinobu Tamaoki, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 249 days.

(21) Appl. No.: 12/076,843

(22) Filed: Mar. 24, 2008

(65) Prior Publication Data

US 2008/0239471 A1   Oct. 2, 2008

(30) Foreign Application Priority Data

Mar. 29, 2007   (JP) .......................... P2007-088943

(51) Int. Cl.
*H04B 10/17* (2006.01)
*H04B 10/12* (2006.01)

(52) U.S. Cl. ................... 359/341.3; 359/341.1

(58) Field of Classification Search ............. 359/341.1, 359/341.3; 385/127
See application file for complete search history.

(56) References Cited

U.S. PATENT DOCUMENTS

| | | | |
|---|---|---|---|
| 6,263,003 B1 * | 7/2001 | Huang et al. ................... 372/6 |
| 6,411,762 B1 * | 6/2002 | Anthon et al. ................. 385/123 |
| 6,487,006 B1 * | 11/2002 | Chen ....................... 359/341.32 |
| 6,959,022 B2 * | 10/2005 | Sandrock et al. ................ 372/6 |
| 7,006,752 B2 * | 2/2006 | Dragic ....................... 385/142 |
| 2003/0016441 A1 * | 1/2003 | Leplingard et al. ........ 359/341.1 |
| 2003/0152349 A1 * | 8/2003 | Lauzon et al. ............... 385/126 |
| 2004/0156401 A1 * | 8/2004 | Sandrock et al. ................ 372/6 |
| 2004/0196537 A1 * | 10/2004 | Starodoumov ........... 359/341.3 |
| 2004/0252961 A1 * | 12/2004 | Peuchert et al. .............. 385/141 |
| 2005/0213908 A1 * | 9/2005 | Dragic .......................... 385/124 |
| 2007/0229940 A1 * | 10/2007 | Sintov ...................... 359/341.3 |
| 2007/0230884 A1 * | 10/2007 | Minelly et al. .............. 385/125 |
| 2009/0251770 A1 * | 10/2009 | Lewis ...................... 359/341.3 |

FOREIGN PATENT DOCUMENTS

WO   WO 2007083452 A1 *   7/2007

* cited by examiner

*Primary Examiner*—Eric Bolda
(74) *Attorney, Agent, or Firm*—Venable LLP; Michael A. Sartori (57) ABSTRACT

The present invention relates to an optical module which is capable of amplifying light to be amplified to high power and which has a structure for effectively reducing influences of damage to other optical parts, and heat generation. The optical module includes a fiber unit constituted by an optical coupler, an amplification optical fiber, and an absorption optical fiber. Each of the amplification optical fiber and the absorption optical fiber has a core, a first cladding, a second cladding, and a third cladding. Further, each of the fibers allows the light to be amplified to propagate in a single mode in each of the cores, and allows pumping light to propagate in a multimode in the core, the first cladding, and the second cladding. The core of the amplification optical fiber is doped with an amplification dopant for amplifying the light to be amplified. The second cladding of the absorption optical fiber is doped with an absorption dopant for absorbing the pumping light.

11 Claims, 10 Drawing Sheets

REFRACTIVE INDEX

AMPLIFICATION DOPANT DOPING

OPTICAL MODULE AND PROCESSING METHOD

BACKGROUND OF THE INVENTION

1. Field of the Invention

The present invention relates to an optical module and a processing method using the same.

2. Related Background Art

At present, processing technology using laser light is attracting much attention, and demand for laser light sources is increasing in various fields such as machining and medical treatment. In particular, among various laser light sources, a laser light source which is attracting special attention includes a fiber laser light source. An optical fiber which is doped with rare earth elements such as Yb, Er and Tm is used as an optical amplification medium, and therefore light to be amplified is amplified by pumping light and laser oscillation is produced using a resonator structure, thereby generating light having a high output. The advantages of the fiber laser light source are that, since the laser light is confined within the optical fiber, treatment is easy, and since heat radiation properties are good, a large-scale cooling installation is not required.

As an amplification optical fiber, a fiber having a refractive index profile of single-cladding type is used in some cases. This amplification optical fiber of single-cladding type has one core which is doped with a rare earth element, and one cladding which surrounds this core and has a refractive index lower than that of the core. Further, this amplification optical fiber allows the light to be amplified to propagate in a single mode in the core and also allows pumping light to propagate in the core. In the amplification optical fiber, the rare earth element is excited by the pumping light and stimulated emission is caused. At this time, the light to be amplified which propagates through the amplification optical fiber is amplified. The pumping light which is not absorbed by the amplification optical fiber transmits through the amplification optical fiber to the outside (hereinafter, the pumping light which transmits is referred to as transmitting pumping light).

Further, as an amplification optical fiber, an optical fiber having a refractive index profile of double-cladding type is preferably used. The amplification optical fiber of double-cladding type has a core which is doped with rare earth elements, an inner cladding which surrounds the core and has a refractive index lower than that of the core, and an outer cladding which surrounds the inner cladding and has a refractive index lower than that of the inner cladding. Further, the amplification optical fiber allows the light to be amplified to propagate in a single mode in the core and allows the pumping light to propagate in a multimode in the core and the inner cladding. When such an amplification optical fiber of double-cladding type is used, high power pumping light is allowed to propagate in the amplification optical fiber and the light to be amplified can be amplified with a high gain (high-power amplified light is obtained).

SUMMARY OF THE INVENTION

The present inventors have examined the above prior art, and as a result, have discovered the following problems.

That is, in the above-described conventional fiber laser light source, pumping light supplied to an amplification optical fiber is used to excite rare earth elements doped in the amplification optical fiber. On the other hand, the pumping light which is not absorbed by the rare earth element is outputted as transmitting pumping light from the amplification optical fiber to the outside. Power of the transmitting pumping light is adjustable by adjusting a length of the amplification optical fiber and a rare earth element doping concentration.

When an amplification optical fiber of single-cladding type is applied for a fiber laser light source, output power of a pumping light source is currently on the order of 500 mW and power of the transmitting pumping light which transmits through the amplification optical fiber to the outside is several dozen mW. When the power of the transmitting pumping light is several dozen mW, even if another single-mode fiber is connected subsequent to the amplification optical fiber, no heat is generated. Normally, while the transmitting pumping light is outputted via a connector from the amplification optical fiber, an isolator is inserted in many cases; accordingly, the transmitting pumping light which propagates through the core, since receiving large loss caused by the isolator to be attenuated, scarcely keeps a high output when being outputted from the connector.

Likewise, also when an amplification optical fiber of double-cladding type is applied for a fiber laser light source, the transmitting pumping light is outputted from the amplification optical fiber to the outside. However, in this case, output power of the pumping light source is as high as several dozen W. Further, even if an optical isolator is installed, it is difficult to effectively cut off the transmitting pumping light which propagates through the core and the inner cladding in a multimode. From the above-described fact, the power of the transmitting pumping light outputted to the outside is several W in some cases. When the power of the transmitting pumping light is large as above, damage to other optical parts by this transmitting pumping light grows large, or alternatively heat is generated. In order that the light to be amplified which is amplified and outputted may have high power, as the supply of the pumping light is more increased and an amplification gain is more enlarged, the power of the transmitting pumping light also grows larger and influences of the damage and the heat generation also grows larger.

The present invention has been developed to eliminate the problems described above. It is an object of the present invention to provide an optical module amplifying the light to be amplified to a high power and having a structure for effectively reducing influences of damage to other optical parts, and heat generation. Further, it is another object of the present invention to provide a processing method of processing a target to be processed using such an optical module.

The optical module according to the present invention includes an amplification optical fiber which amplifies light to be amplified by supply of pumping light, an absorption optical fiber which is disposed in a position where the pumping light outputted from the amplification optical fiber reaches and which absorbs the pumping light, and an optical coupler which supplies at least the pumping light to the amplification optical fiber. Each of the amplification optical fiber and the absorption optical fiber has a core extending along a predetermined axis, a first cladding provided on an outer periphery of the core and having a refractive index lower than that of the core, a second cladding provided on an outer periphery of the first cladding and having a refractive index lower than that of the core, and a third cladding provided on an outer periphery of the second cladding and having a refractive index lower than those of the first and second claddings. Further, these amplification optical fiber and absorption optical fiber allow the light to be amplified to propagate in a single mode in the core and allow the pumping light to propagate in a multimode in the core, the first cladding, and the second cladding.

Further, the core of the amplification optical fiber is doped with an amplification dopant excited by the pumping light to amplify the light to be amplified. On the other hand, the first cladding of the amplification optical fiber is a region in which no amplification dopant is intentionally doped. The second cladding of the absorption optical fiber is doped with an absorption dopant for absorbing the pumping light. The respective cores of the amplification optical fiber and the absorption optical fiber are optically connected to each other. The respective first claddings of the amplification optical fiber and the absorption optical fiber are optically connected to each other. Further, the respective second claddings of the amplification optical fiber and the absorption optical fiber are optically connected to each other.

In addition, in the absorption optical fiber, respective refractive indexes of the first cladding and the second cladding may be equal to each other, or alternatively, the refractive index of the first cladding may be higher than that of the second cladding.

In the optical module according to the present invention, it is preferred that the amplification dopant contains Yb and the absorption dopant contains Er. An Er doping concentration in the second cladding of the absorption optical fiber is preferably 1000 wt.ppm or more but 8000 wt.ppm or less. The core of the absorption optical fiber is preferably comprised of pure silica. The first cladding of the absorption optical fiber is preferably a region in which no amplification dopant excited by the pumping light to amplify the light to be amplified is intentionally doped. The core of the absorption optical fiber is preferably a region in which no absorption dopant for absorbing the pumping light is intentionally doped.

Further, in the case of forward pumping, preferably, the optical module according to the present invention has a structure in which the absorption optical fiber is connected to an output end which outputs the light to be amplified and the pumping light through the amplification optical fiber, and has a single-mode optical fiber connected to an output end of this absorption optical fiber. On the other hand, in the case of backward pumping, the optical module may have a structure in which the absorption optical fiber and the amplification optical fiber are disposed in sequence along the traveling direction of the light to be amplified, and have the single-mode optical fiber connected to the output end (input end of the pumping light for the backward pumping) of the light to be amplified through the amplification optical fiber. This single-mode optical fiber has a core which allows the amplified light outputted from the amplification optical fiber to propagate in a single mode, and a cladding which surrounds the core and has a refractive index lower than that of the core and which prevents the pumping light from propagating. Further, the first cladding of the absorption optical fiber may be also doped with the absorption dopant for absorbing the pumping light.

A processing method according to the present invention is adapted to process a predetermined target using the optical module (optical module according to the present invention) having the above-described structure. When the amplified light is outputted from the optical module which amplifies the light to be amplified by supplying the pumping light via the optical coupler, the amplified light is irradiated onto the target via an optical system for condensing the amplified light. Further, in the case of forward pumping, as viewed from the traveling direction of the light to be amplified, the amplification optical fiber is disposed upstream and on the other hand, the absorption optical fiber is disposed downstream. In this structure, in the absorption optical fiber, the pumping light (transmitting pumping light having passed through the amplification optical fiber) is converted into visible light by the upconversion. When this visible light is condensed and irradiated onto a target to be processed via the optical system from the output end of the absorption optical fiber, positioning of the target relative to a light output end of the optical module becomes easy. That is, the upconversion light (visible light) of the transmitting pumping light can be used as guide light for positioning.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will be apparent to those skilled in the art from this detailed description.

DESCRIPTION OF THE PREFERRED EMBODIMENTS

In the following, embodiments of an optical module according to the present invention will be described in detail with reference to FIGS. 1, 2A and 2B, 3 and 4, 5A to 6B, and 7 to 10. In the description of the drawings, identical or corresponding components are designated by the same reference numerals, and overlapping description is omitted.

Comparative Example

Figure 1:
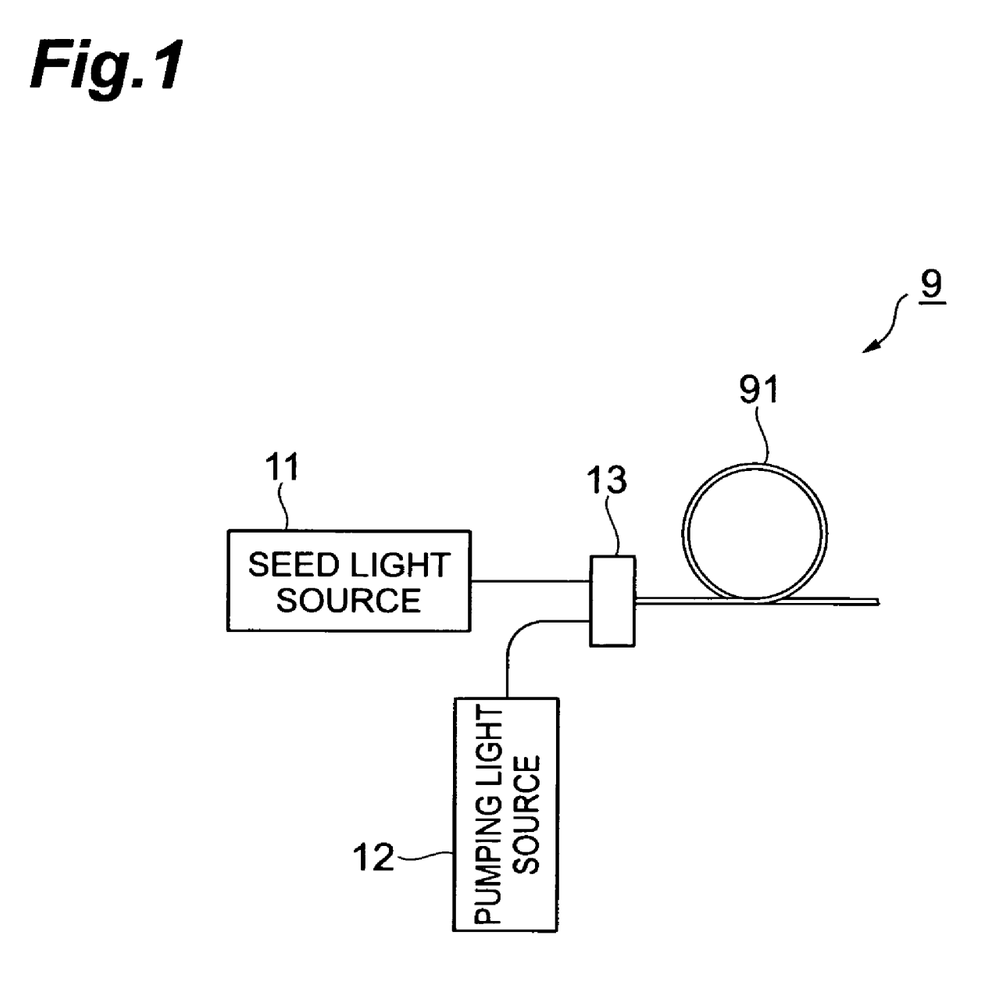
FIG. 1 is a view showing a structure of an optical module according to a comparative example.
Figure 2A:
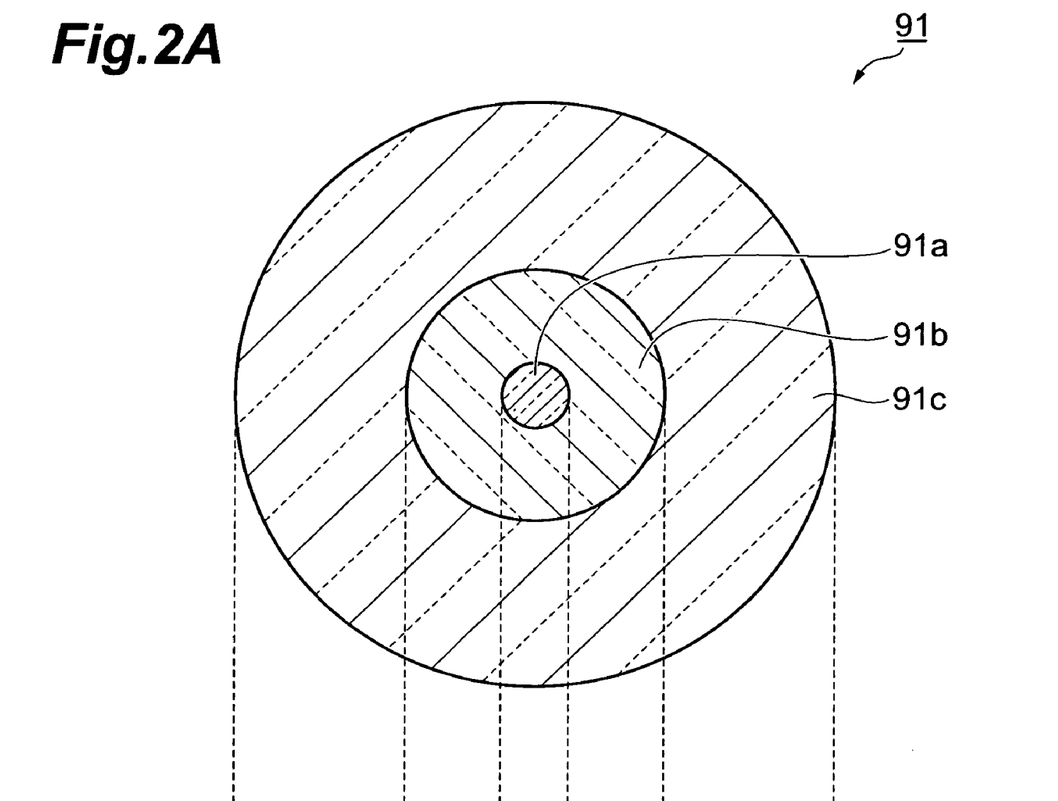
FIG. 2A is a view showing a cross sectional structure of an amplification optical fiber included in the optical module according to the comparative example.

First, the optical module of the comparative example will be described. FIG. 1 is a view showing a structure of the optical module according to the comparative example. In FIG. 1, an optical module 9 according to the comparative example includes a seed light source 11, a pumping light source 12, an optical coupler 13 and an amplification optical fiber 91. FIG. 2A is a view showing a cross sectional structure of the amplification optical fiber 91 included in the optical module 9 according to the comparative example, and FIG. 2B is a graph showing a refractive index profile of the fiber 91.

Figure 2B:
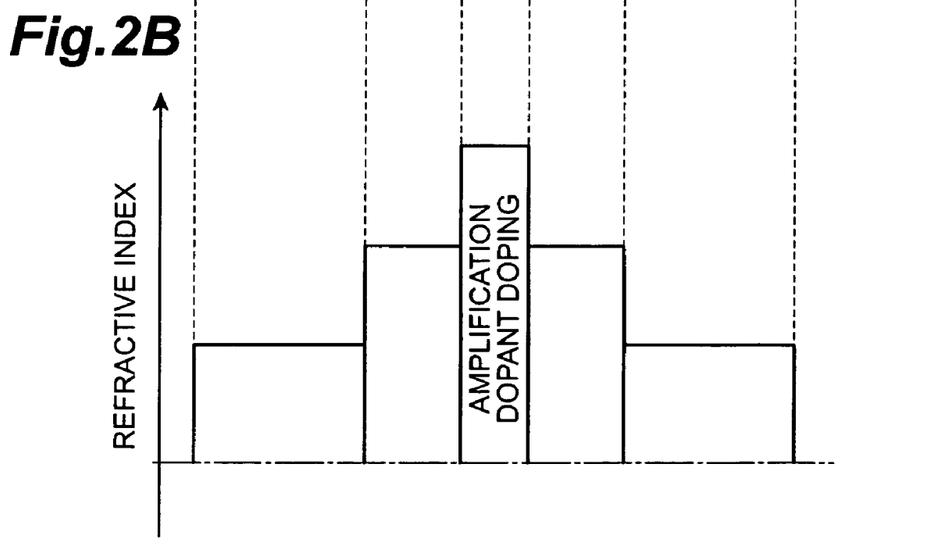
FIG. 2B is a graph showing a refractive index profile of the amplification optical fiber.

As shown in FIGS. 2A and 2B, the amplification optical fiber 91 has a core 91a extending along a predetermined axis, an inner cladding 91b (first cladding) provided on an outer periphery of the core 91a and having a refractive index lower than that of the core 91a, and an outer cladding 91c provided on an outer periphery of the inner cladding 91b and having a refractive index lower than that of the inner cladding 91b. The amplification optical fiber 91 is an optical fiber mainly comprised of silica-based glass, and has the core 91a which is doped with rare earth elements as an amplification dopant. Further, the amplification optical fiber 91 allows the light to be amplified to propagate in a single mode in the core 91a and allows the pumping light to propagate in a multimode in the core 91a and the inner cladding 91b. When the amplification optical fiber 91 of such a double-cladding type is used, high-power pumping light is allowed to propagate in the amplification optical fiber 91. That is, the light to be amplified can be amplified with a high gain (high-power amplified light is obtained).

In this optical module 9, seed light (light to be amplified) outputted from the seed light source 11 and pumping light outputted from the pumping light source 12 are multiplexed by the optical coupler 13 and inputted to one end of the amplification optical fiber 91. In the amplification optical fiber 91, the light to be amplified propagates in a single mode through the core 91a, and the pumping light propagates in a multimode through the core 91a and the inner cladding 91b. The rare earth element which is doped in the core 91a is excited by the pumping light, and the light to be amplified is amplified. Further, the light to be amplified which is amplified is outputted to the outside from the other end of the amplification optical fiber 91 and at the same time, the pumping light which is not absorbed by the rare earth element is outputted as transmitting pumping light.

More specifically, the amplification optical fiber 91 has the core 91a which is doped with Yb as an amplification dopant; further, an Yb doping concentration of the core 91a is 12000 wt.ppm and a length of the fiber 91 is 5 m. A center wavelength of the seed light outputted from the seed light source 11 is 1060 nm. A center wavelength of the pumping light outputted from the pumping light source 12 is 974 nm.

Figure 3:
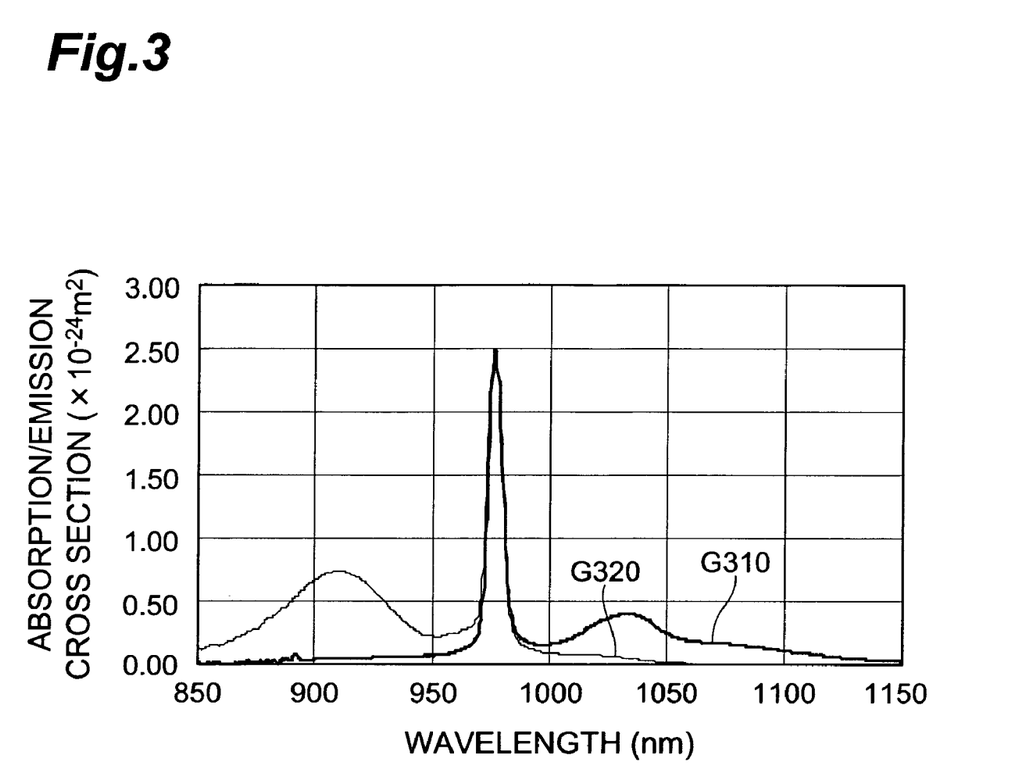
FIG. 3 is a graph showing wavelength characteristics of Yb of absorption/emission cross section.

FIG. 3 is a graph showing wavelength characteristics of Yb of absorption/emission cross section. In addition, in FIG. 3, a graph G310 illustrates a wavelength characteristic of the emission cross section, and a graph G320 illustrates a wavelength characteristic of the absorption cross section.

The light to be amplified has any wavelength in the range of 1020 to 1100 nm and can be amplified. Further, the pumping light can be pumped even when a center wavelength is a 915 nm band (915 nm±30 nm); however, due to the fact that the absorption coefficient is high, a wavelength of a 974 nm band (974 nm±10 nm) is selected. Any of the wavelength of the light to be amplified and that of the pumping light may be within the above-described wavelength range.

An absorption of Yb in the pumping light wavelength of 974 nm is about 2 dB/m. A plurality of the pumping light sources 12 is connected to the optical coupler 13 and a total of about 40 W of the pumping light is incident on the amplification optical fiber 91. Power of the transmitting pumping light which is pumped by power of about 40 W is about 4 W.

The transmitting pumping light having power of about 4 W, when being outputted via a connector with installing no single-mode optical fiber and no optical parts subsequent to the amplification optical fiber 91, is also outputted with core propagation light and therefore, damage to an irradiated target by the transmitting pumping light is feared. Further, when the single-mode optical fiber is connected subsequent to the amplification optical fiber 91, a temperature at the connection point reaches 80° C. or more after 10 minutes and therefore, the fibers are feared as a heat generator.

When a length of the amplification optical fiber 91 and a rare earth element doping concentration are adjusted, power of the transmitting pumping light can be reduced. However, when the fiber length is too long, output reduction of the light to be amplified and occurrence of a nonlinear effect are incurred, whereas when the rare earth element doping concentration is too high, output reduction of the light to be amplified is incurred due to occurrence of photodarkening. Therefore, for increasing the output of the light to be amplified, the transmitting pumping light power cannot be prevented from increasing and measures against the transmitting pumping light power are required.

First Embodiment

Figure 4:
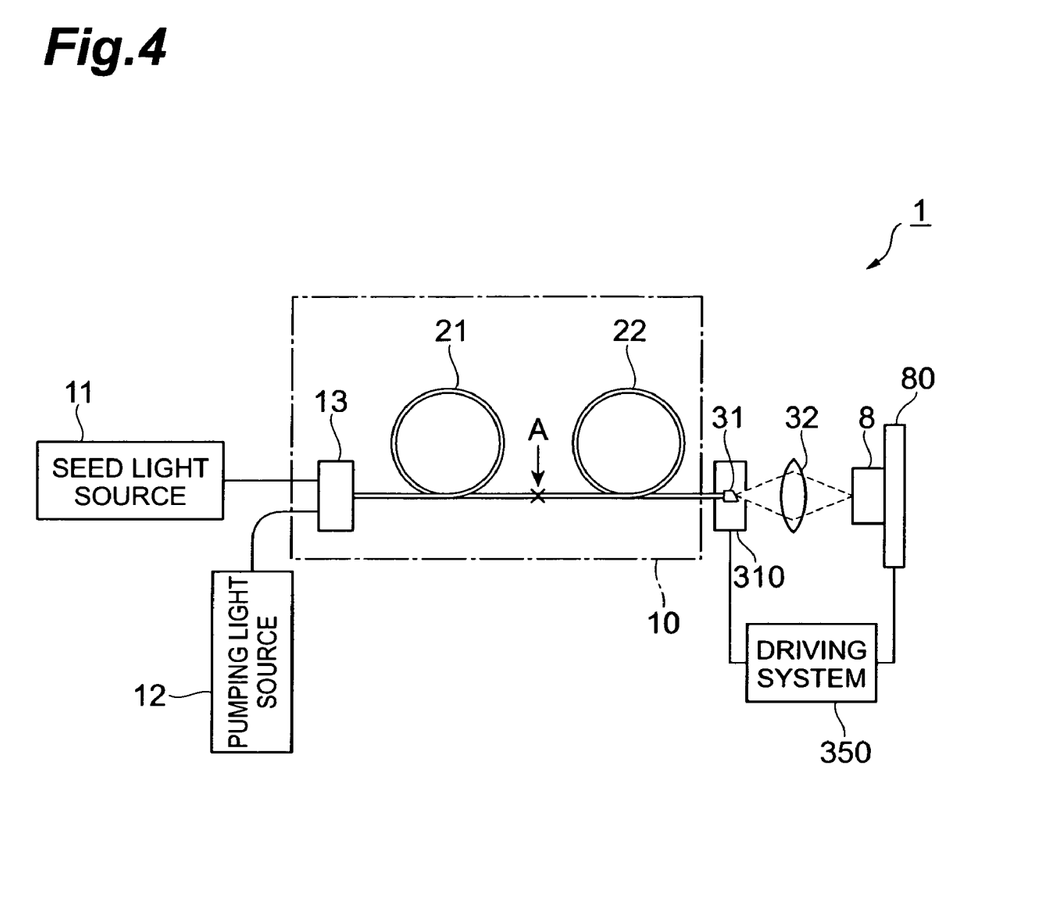
FIG. 4 is a view showing a structure of a first embodiment of the optical module according to the present invention.
Figure 5A:
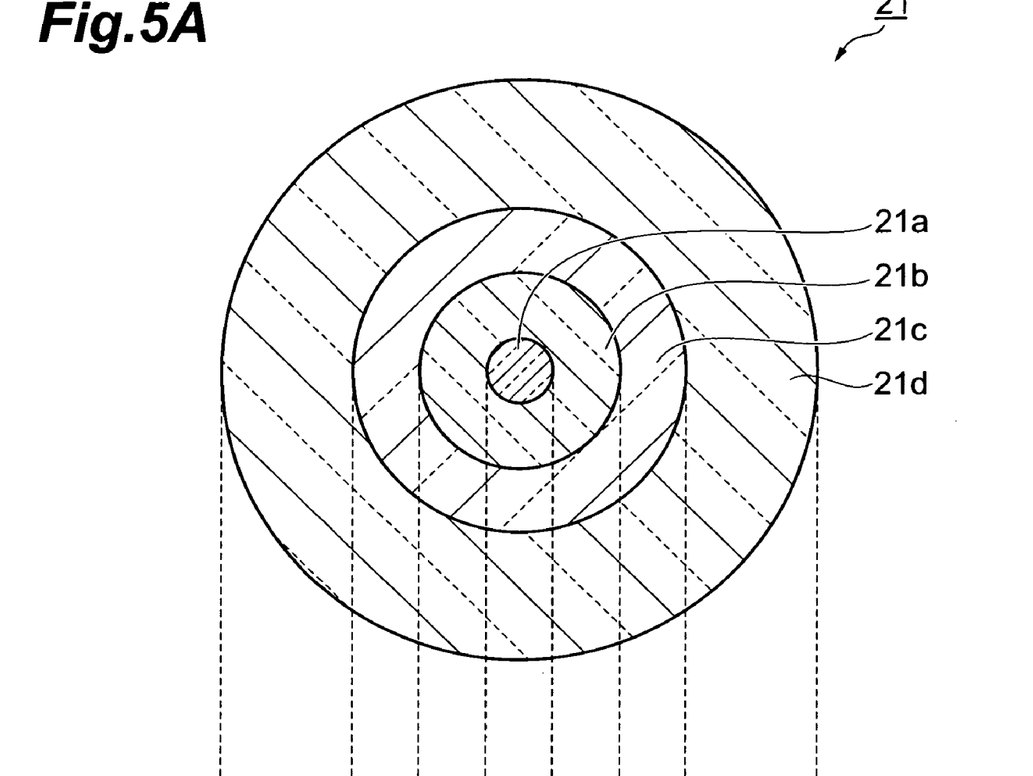
FIG. 5A is a view showing a cross sectional structure of the amplification optical fiber included in the optical module according to the first embodiment.
Figure 5B:
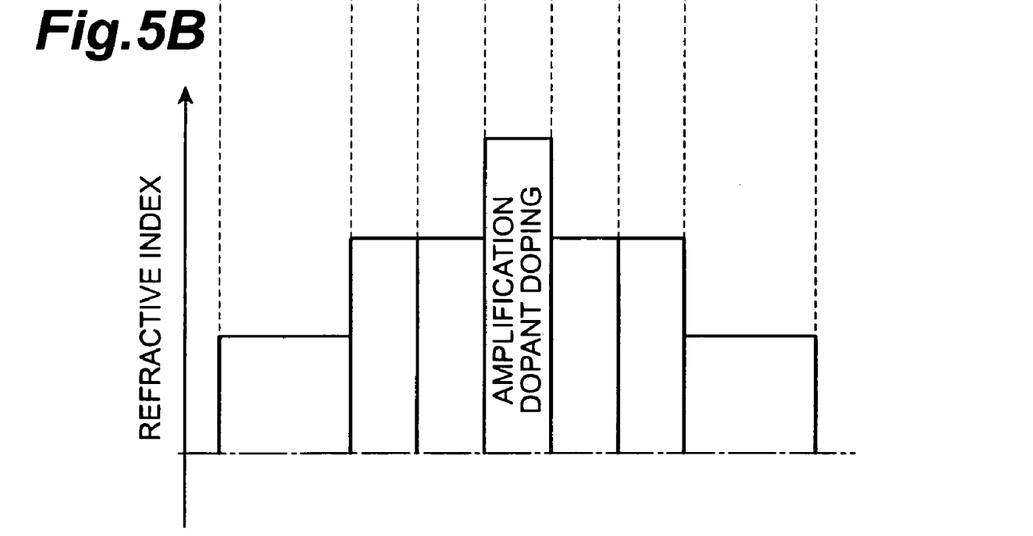
FIG. 5B is a graph showing a refractive index profile of the amplification optical fiber.
Figure 6A:
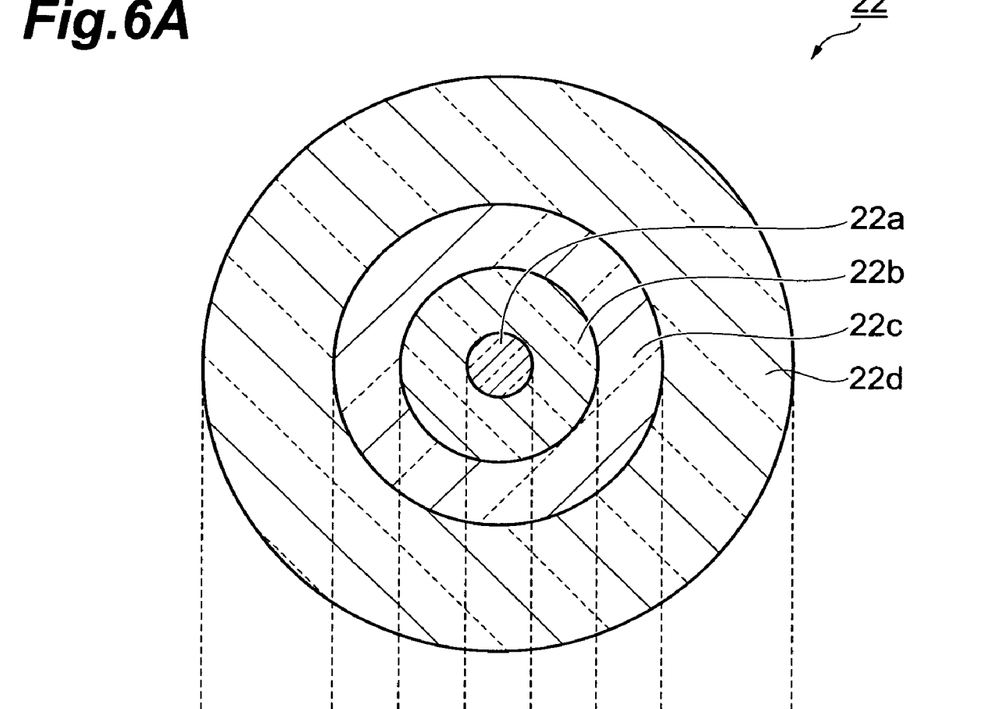
FIG. 6A is a view showing a cross sectional structure of an absorption optical fiber included in the optical module according to the first embodiment.
Figure 6B:
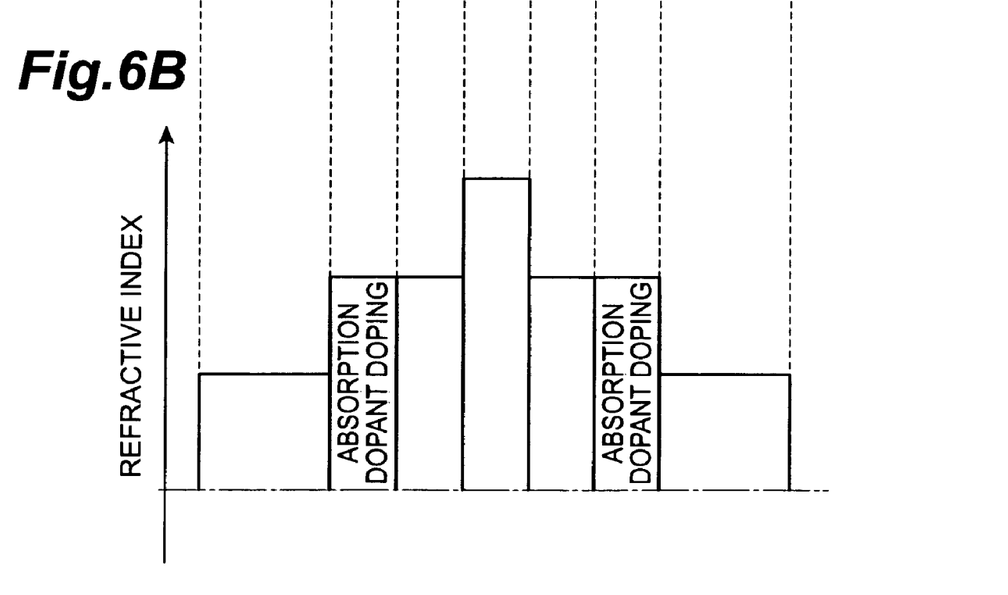
FIG. 6B is a graph showing a refractive index profile of the absorption optical fiber.

Next, a first embodiment of the optical module and processing method according to the present invention will be described. FIG. 4 is a view showing a structure of the first embodiment of the optical module according to the present invention. In FIG. 4, an optical module 1 according to the first embodiment is an optical device for processing a target to be processed 8. The module 1 includes the seed light source 11, the pumping light source 12, the optical coupler 13, an amplification optical fiber 21, an absorption optical fiber 22 which is fusion-spliced to the amplification optical fiber 21 at a connection point A, an APC optical connector 31 and an optical system 32. Further, a fiber unit 10 is constituted by the optical coupler 13, the amplification optical fiber 21, and the absorption optical fiber 22. Relative position adjustment of the target to be processed 8 relative to the APC optical connector 31 from which the amplified light is outputted is performed by moving a stage 310 having the APC optical connector 31 attached thereto and a stage 80 having the target to be processed 8 installed thereon using a driving system 350. FIG. 5A is a view showing a cross sectional structure of the amplification optical fiber 21 included in the optical module 1 according to the first embodiment, and FIG. 5B is a graph showing a refractive index profile of the fiber 21. FIG. 6A is a view showing a cross sectional structure of the absorption optical fiber 22 included in the optical module 1 according to the first embodiment, and FIG. 6B is a graph showing a refractive index profile of the fiber 22.

As shown in FIG. 5A, the amplification optical fiber 21 includes a core 21a extending along a predetermined axis, a first cladding 21b provided on an outer periphery of the core 21a, a second cladding 21c provided on an outer periphery of the first cladding 21b, and a third cladding 21d provided on an outer periphery of the second cladding 21c. Further, as shown in FIG. 5B, the first cladding 21b has a lower refractive index than that of the core 21a, the second cladding 21c has a refractive index lower than that of the core 21a, and the third cladding 21d has a refractive index lower than those of the first cladding 21b and the second cladding 21c. The amplification optical fiber 21 allows the light to be amplified to propagate in a single mode in the core 21a, and also allows the pumping light to propagate in a multimode in the core 21a, the first cladding 21b, and the second cladding 21c. The amplification optical fiber 21 is mainly comprised of silica-based glass and has the core 21a which is doped with a rare earth element or transition metal element as an amplification dopant excited by the pumping light to amplify the light to be amplified.

As shown in FIG. 6A, the absorption optical fiber 22 includes a core 22a extending along a predetermined axis, a first cladding 22b provided on an outer periphery of the core 22a, a second cladding 22c provided on an outer periphery of the first cladding 22b, and a third cladding 22d provided on an outer periphery of the second cladding 22c. Further, as shown in FIG. 6B, the first cladding 22b has a refractive index lower than that of the core 22a, the second cladding 22c has a refractive index lower than that of the core 22a and further, the third cladding 22d has a refractive index lower than those of the first cladding 22b and the second cladding 22c. In addition, the respective refractive indexes of the first cladding 22b and the second cladding 22c may be equal to each other, or alternatively the refractive index of the first cladding 22b may be higher than that of the second cladding 22c. A diameter of the first cladding 22b is on the order of twice that of the core 22a. The absorption optical fiber 22 allows the light to be amplified to propagate in a single mode in the core 22a, and also allows the pumping light to propagate in a multimode in the core 22a, the first cladding 22b, and the second cladding 22c. The absorption optical fiber 22 is mainly comprised of silica-based glass and has the second cladding 22c which is doped with a rare earth element or transition metal element as an absorption dopant for absorbing the pumping light.

The core 22a of the absorption optical fiber 22 is not intentionally doped with any of the amplification dopant and the absorption dopant. The first cladding 22b of the absorption optical fiber 22 is not intentionally doped with the amplification dopant; however, the cladding 22b may be doped with the absorption dopant. The core 22a of the absorption optical fiber 22 is preferably made of pure silica and by doing this, the light to be amplified propagates through the core 22a with a low loss. In addition, the "pure silica" indicates silica glass not containing as a dopant the amount of fluctuating a refractive index as much as 0.1% or more.

The core 21a of the amplification optical fiber 21 and the core 22a of the absorption optical fiber 22 are optically connected to each other. The first cladding 21b of the amplification optical fiber 21 and the first cladding 22b of the absorption optical fiber 22 are optically connected to each other. Further, the second cladding 21c of the amplification optical fiber 21 and the second cladding 22c of the absorption optical fiber 22 are optically connected to each other.

In this optical module 1, the seed light (light to be amplified) outputted from the seed light source 11 and the pumping light outputted from the pumping light source 12 are multiplexed by the optical coupler 13. Multiplexed light inputted to one end of the amplification optical fiber 21 propagates in the order from the amplification optical fiber 21 to the absorption optical fiber 22. In the amplification optical fiber 21 the light to be amplified propagates in a single mode through the core 21a and the pumping light propagates in a multimode through the core 21a, the first cladding 21b, and the second cladding 21c. In this amplification optical fiber 21, an amplification dopant which is doped in the core 21a is excited by the pumping light and the light to be amplified is amplified. Further, from the other end of the amplification optical fiber 21 to the absorption optical fiber 22, the light to be amplified which is amplified is outputted and at the same time, the pumping light which is not absorbed by the amplification dopant is outputted as the transmitting pumping light.

In the absorption optical fiber 22 to one end of which the light to be amplified which is amplified and the transmitting pumping light are inputted from the amplification optical fiber 21, the light to be amplified propagates in a single mode through the core 22a and the transmitting pumping light propagates in a multimode through the core 22a, the first cladding 22b, and the second cladding 22c. In this absorption optical fiber 22, the transmitting pumping light is absorbed by the absorption dopant doped in the second cladding 22c. Further, from the other end of the absorption optical fiber 22 to the outside via the optical connector 31, the light to be amplified which is amplified is outputted and at the same time, the transmitting pumping light which is not absorbed by the absorption dopant is outputted. The light to be amplified which is outputted from the optical connector 31 to the outside is condensed and irradiated onto the target to be processed 8 by the optical system 32. Thereby, the target to be processed 8 is processed.

At this time, in light outputted from the optical connector 31 to the outside, not only the light to be amplified which is amplified in the amplification optical fiber 21 but also the transmitting pumping light is included. However, the transmitting pumping light which is not absorbed by the amplification dopant doped in the core 21a of the amplification optical fiber 21 is absorbed by the absorption dopant doped in the second cladding 22c of the absorption optical fiber 22 in a stage subsequent to a stage of the fiber 21. Accordingly, power of the transmitting pumping light outputted from the optical connector 31 to the outside is reduced. A doping concentration of the absorption dopant in the absorption optical fiber 22 or a length of the fiber 22 is adjusted based on a size of the power of the pumping light which transmits through the amplification optical fiber 21, whereby the power of the transmitting pumping light can be suppressed.

More specifically, in the amplification optical fiber 21, the core 21a is doped with Yb as an amplification dopant, an Yb doping concentration of the core 21a is 12000 wt.ppm, and a length of the fiber 21 is 5 m. Each of the first cladding 21b and the second cladding 21c is a non-intentionally doped region. In the absorption optical fiber 22, the core 22a is a non-intentionally doped region, and the first cladding 22b and the second cladding 22c are doped with Er as the absorption dopant. Further, an Er doping concentration of the respective claddings is 1000 wt.ppm, and a length of the fiber 22 is 1 m. A center wavelength of the seed light outputted from the seed light source 11 is 1060 nm. A center wavelength of the pumping light outputted from the pumping-light source 12 is 974 nm.

Figure 7:
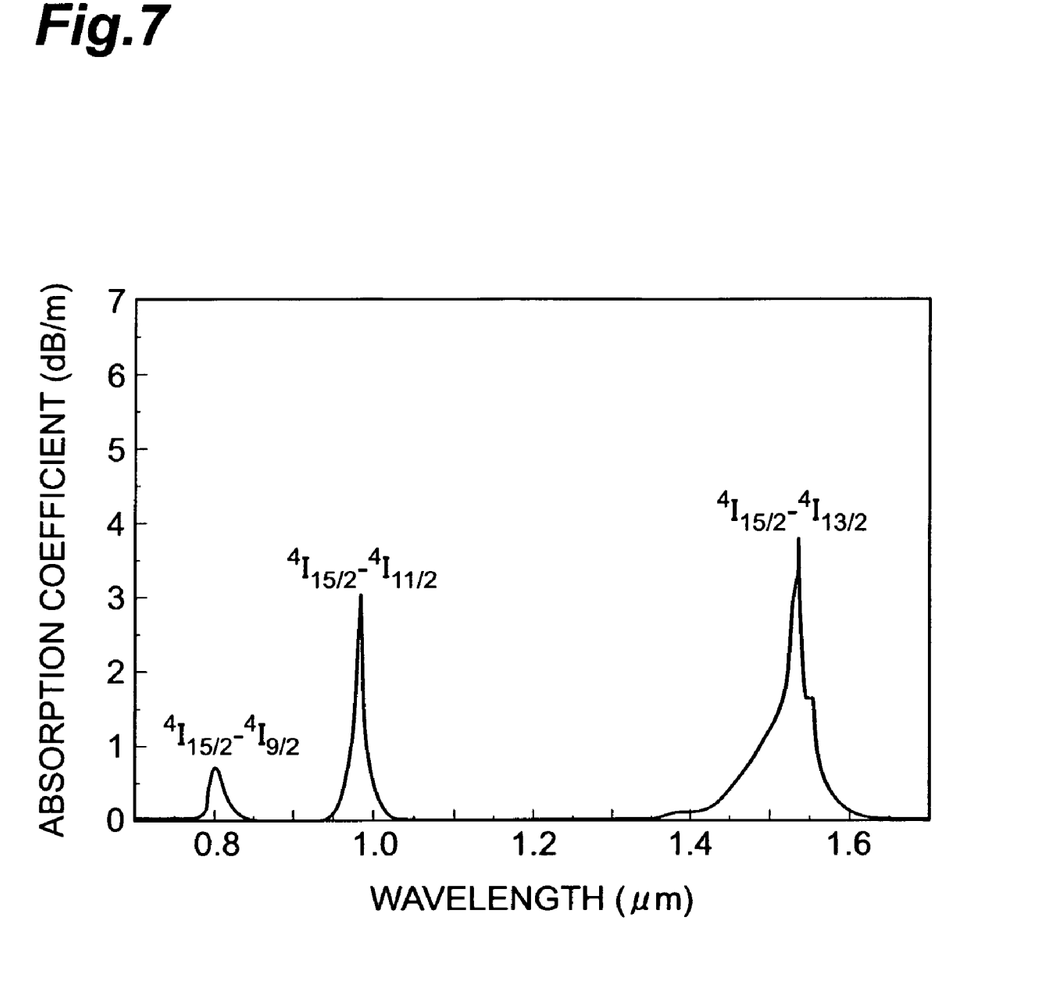
FIG. 7 is a graph showing a wavelength characteristic of an absorption coefficient of Er.

FIG. 7 is a graph showing a wavelength characteristic of the absorption coefficient of Er. FIG. 7 shows data of the absorption coefficient at the time when the measurement is performed under the condition that an Er doping concentration is 320 wt.ppm and a length of Er-doped optical fiber is 1 m. As can be seen from respective wavelength characteristics of the absorption/emission cross section of Yb shown in FIG. 3 and a wavelength characteristic of the absorption coefficient of Er shown in FIG. 7, the pumping light used for exciting Yb is absorbed also by Er and on the other hand, the light to be amplified having a wavelength of 1060 nm is not absorbed, even when leaking out to and propagating through the cladding of the absorption optical fiber 22. This holds true for a combination of the following ways: a way to dope Yb in the core of the amplification optical fiber 21 to amplify the light to be amplified, and a way to absorb the transmitting pumping light by Er doped in the cladding of the absorption optical fiber 22.

In the amplification optical fiber 21, when the Yb doping concentration is 12000 wt.ppm, an absorption coefficient of the pumping light is about 2 dB/m. In the absorption optical fiber 22, when the Er doping concentration is 1000 wt.ppm, an absorption coefficient of the pumping light is about 8.9 dB/m. A plurality of the pumping light sources 12 is connected to the optical coupler 13 and a total of about 40 W of the pumping light is incident on the amplification optical fiber 21. The power of the transmitting pumping light which transmits through the amplification optical fiber 21 is about 4 W. Since a loss of the pumping light in the absorption optical fiber 22 is about 8.9 dB, the transmitting pumping light having power of about 4 W at the input end of the absorption optical fiber 22 is reduced to about 0.4 W at the output end of the absorption optical fiber 22. When the power of the transmitting pumping light at the output end of the absorption optical fiber 22 is reduced to this extent, the power is hardly generated also as the amount of heat and therefore, there is no factor in the heat generation. Particularly, the Er doping concentration may be 2000 wt.ppm or 3000 wt.ppm. When the concentration exceeds 6000 wt.ppm, upconversion easily occurs and in this case, the ideal Er doping concentration is on the order of 8000 wt.ppm.

Further, it is known from past experimental examples that when the Er doping concentration is increased, concentration quenching occurs. In most of the Er-doped optical fibers used in amplifiers for communication, the Er doping concentration is suppressed to 1000 wt.ppm or less to avoid the concentration quenching. However, in the present embodiment, as luminous efficiency in the absorption optical fiber 22 becomes worse, the circumstances are better; therefore, it is preferred that the fiber 22 is doped with Er in a high concentration.

Figure 8:
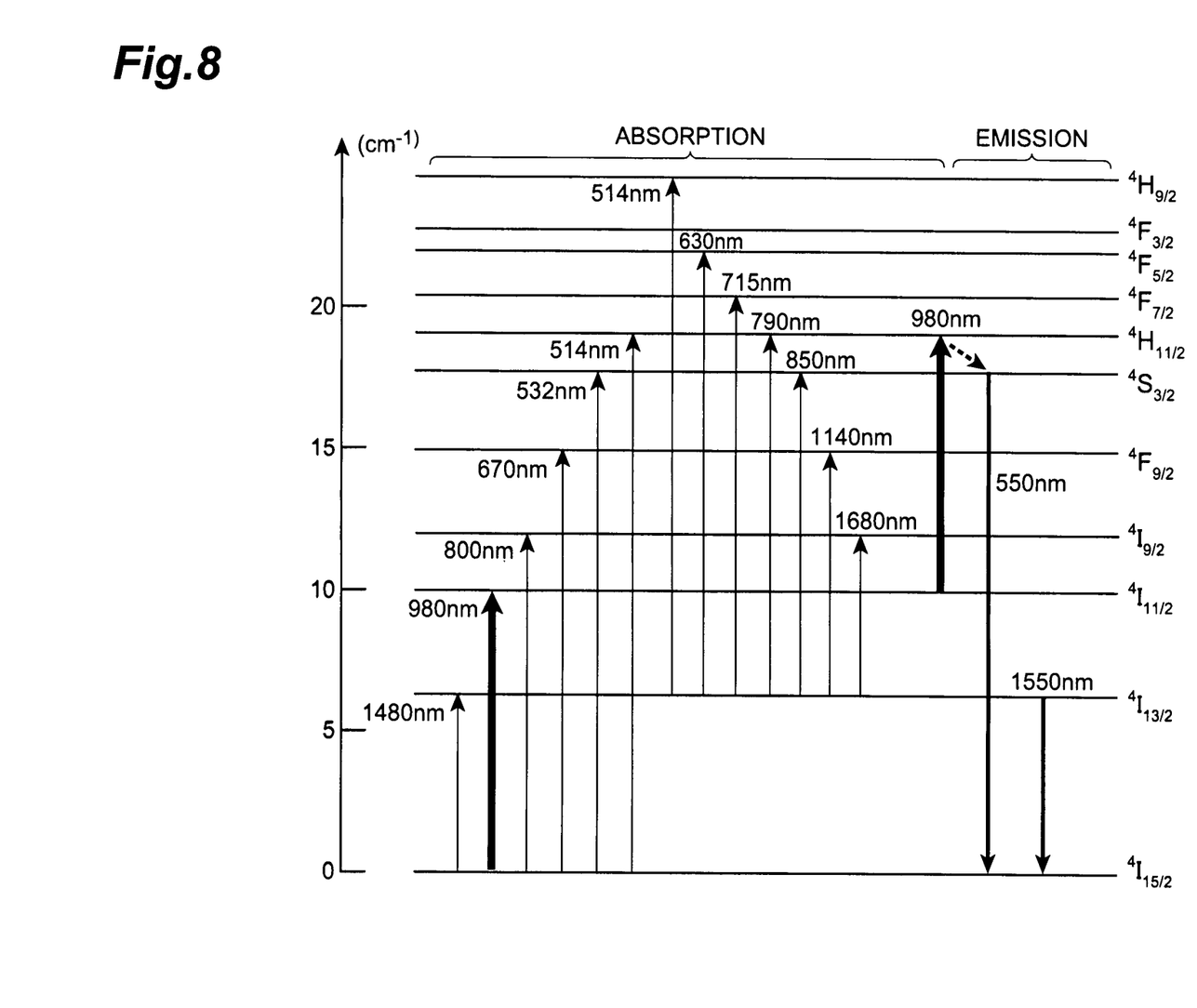
FIG. 8 is a graph showing levels of emission and absorption of Er.

FIG. 8 is a graph showing levels of emission and absorption of Er. As described in the above-described embodiment, when the pumping light having a wavelength of 974 nm band is used, Er emits light having a wavelength of 1550 nm band. When the Er doping concentration is high, the light having a wavelength of 1550 nm band crosses and relaxes to adjacent Er, and energy is used for transition between levels. Therefore, since the luminous efficiency of the light having a wavelength of 1550 nm band is reduced, ASE power is lowered.

When the Er-doped optical fiber is excited, yellow-green light having a wavelength of 540 nm band, which is generally referred to as upconversion light, is generated. The reason is that the pumping light having a wavelength of 974 nm band slightly causes ESA (Excited State Amplification). Generally, the light is referred to as the upconversion light. The probability of occurrence of ESA is low when the Er-doped optical fiber is excited by the pumping light having a wavelength of 974 nm band; however, the upconversion light which is generated in the cladding of the absorption optical fiber 22 is visible light which propagates to the direction in accord with the propagation direction of the light to be amplified and therefore, available for light for positioning the light to be amplified having a wavelength of 1060 nm band as invisible light. The luminous efficiency of the light having a wavelength of 1550 nm band is reduced due to cross-relaxation; however, the upconversion light having a wavelength of 550 nm band, since being not subjected to the cross-relaxation, is independent on the concentration quenching.

Second Embodiment

Figure 9:
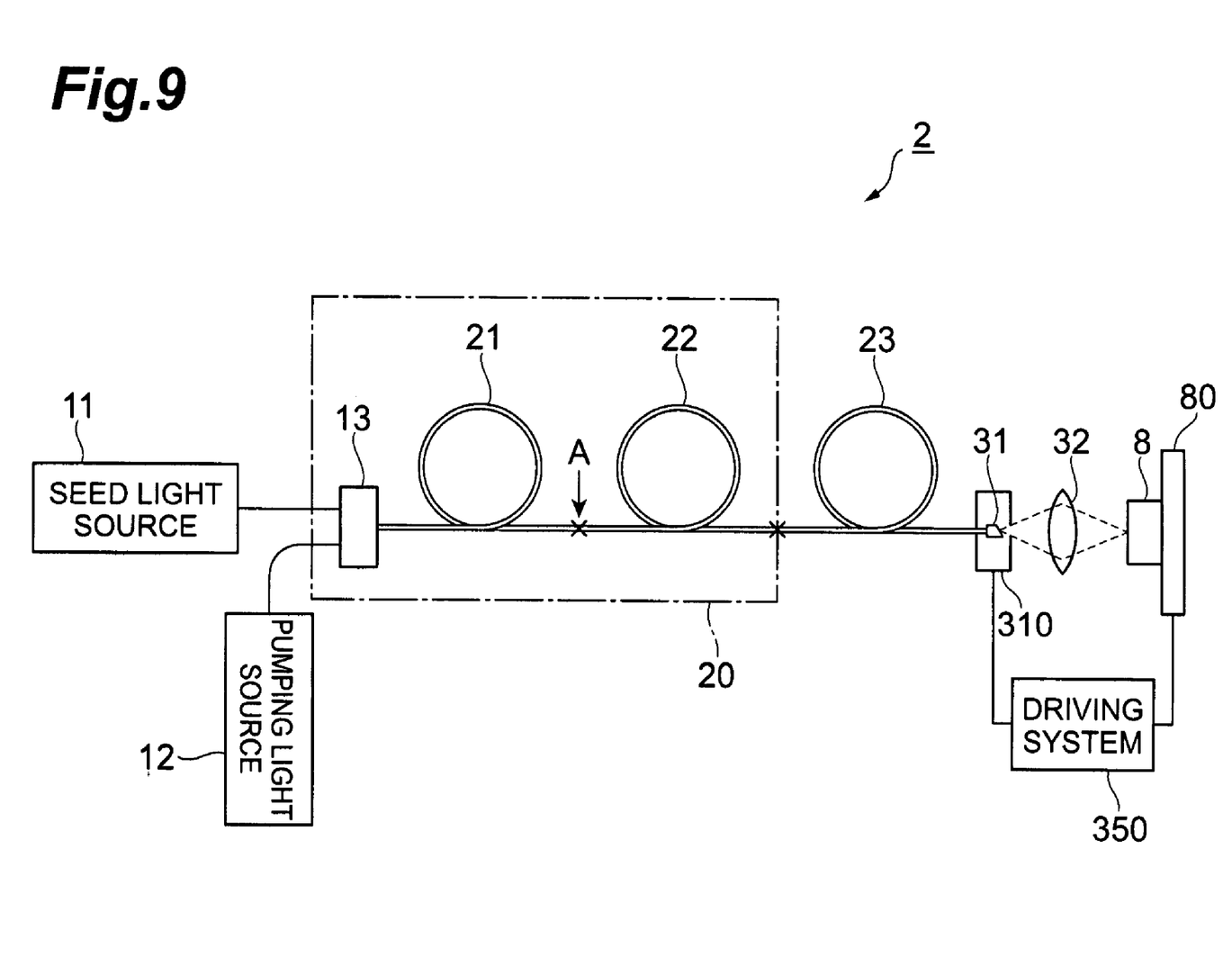
FIG. 9 is a view showing a structure of a second embodiment of the optical module according to the present invention.

Next, a second embodiment of the optical module and processing method according to the present invention will be described. FIG. 9 is a view showing a structure of the second embodiment of the optical module according to the present invention. In FIG. 9, an optical module 2 according to the second embodiment is an optical device for processing the target to be processed 8. The module 2 includes the seed light source 11, the pumping light source 12, the optical coupler 13, the amplification optical fiber 21, the absorption optical fiber 22 which is fusion-spliced to the amplification optical fiber 21 at the connection point A, a single-mode optical fiber 23, the APC optical connector 31 and the optical system 32. Further, a fiber unit 20 is constituted by the optical coupler 13, the amplification optical fiber 21, the absorption optical fiber 22, and the single-mode optical fiber 23. The relative position adjustment of the target to be processed 8 relative to the APC optical connector 31 from which the amplified light is outputted is performed by moving the stage 310 having the APC optical connector 31 attached thereto and the stage 80 having the target to be processed 8 installed thereon using a driving system 350.

As compared to a structure of the optical module 1 according to the first embodiment shown in FIG. 4, the optical module 2 according to the second embodiment shown in this FIG. 9 differs from the module 1 in that the module 2 further includes the single-mode optical fiber 23 in a stage subsequent to a stage of the absorption optical fiber 22. The single-mode optical fiber 23 is connected to the output end of the absorption optical fiber 22 and further, has a core through which the light to be amplified propagates in a single mode, and a cladding which surrounds this core and has a refractive index lower than that of the core and which prevents the pumping light from propagating.

In this optical module 2, the seed light (light to be amplified) outputted from the seed light source 11 and the pumping light outputted from the pumping light source 12 are multiplexed by the optical coupler 13 and inputted to one end of the amplification optical fiber 21 and further, propagates in the order of the amplification optical fiber 21, the absorption optical fiber 22, and the single-mode optical fiber 23. In the amplification optical fiber 21, the light to be amplified propagates in a single mode through the core 21a and the pumping light propagates in a multimode through the core 21a, the first cladding 21b, and the second cladding 21c. In this amplification optical fiber 21, an amplification dopant which is doped in the core 21a is excited by the pumping light and the light to be amplified is amplified. Further, from the other end of the amplification optical fiber 21 to the absorption optical fiber 22, the light to be amplified which is amplified is outputted and at the same time, the pumping light which is not absorbed by the amplification dopant is outputted as the transmitting pumping light.

In the absorption optical fiber 22 to one end of which the light to be amplified which is amplified and the transmitting pumping light are inputted from the amplification optical fiber 21, the light to be amplified propagates in a single mode through the core 22a and the transmitting pumping light propagates in a multimode through the core 22a, the first cladding 22b, and the second cladding 22c. In this absorption optical fiber 22, the transmitting pumping light is absorbed by the absorption dopant doped in the second cladding 22c. Further, from the other end of the absorption optical fiber 22 to the single-mode optical fiber 23, the light to be amplified which is amplified is outputted and at the same time, the transmitting pumping light which is not absorbed by the absorption dopant is outputted.

In the single-mode optical fiber 23 to one end of which the light to be amplified and the transmitting pumping light are inputted from the absorption optical fiber 22, the light to be amplified and the transmitting pumping light propagate through the core and are outputted from the other end of the fiber 23 to the outside via the optical connector 31. The light to be amplified which is outputted from the optical connector 31 to the outside is condensed and irradiated onto the target to be processed 8 by the optical system 32. Thereby, the target to be processed 8 is processed.

At this time, in light outputted from the optical connector 31 to the outside, not only the light to be amplified which is amplified in the amplification optical fiber 21 but also the transmitting pumping light is included. However, the transmitting pumping light which is not absorbed by the amplification dopant doped in the core 21a of the amplification optical fiber 21 is absorbed by the absorption dopant doped in the second cladding 22c of the absorption optical fiber 22 in a stage subsequent to a stage of the fiber 21. Accordingly, power of the transmitting pumping light outputted from the optical connector 31 to the outside is reduced. A doping concentration of the absorption dopant in the absorption optical fiber 22 or a length of the fiber 22 is adjusted based on a size of the power of the pumping light which transmits through the amplification optical fiber 21, whereby the power of the transmitting pumping light can be suppressed.

Further, the upconversion light having a wavelength of 550 nm band generated in the absorption optical fiber 22 propagates through the core of the single-mode optical fiber 23 with the light to be amplified and is outputted to the outside via the optical connector 31 to thereby be condensed and irradiated onto the target to be processed 8 by the optical system 32. In the first embodiment, the upconversion light is outputted to the outside from the core 22a, the first cladding 22b, and the second cladding 22c in the output end of the absorption optical fiber 22. As compared to the first embodiment, in the second embodiment, the upconversion light is outputted with the light to be amplified to the outside from the core in the output end of the single-mode optical fiber 23 and therefore, in the target to be processed 8, respective condensed beam diameters of the upconversion light and the light to be amplified are almost the same to each other. Accordingly, the positioning accuracy using the upconversion light is excellent.

Third Embodiment

Figure 10:
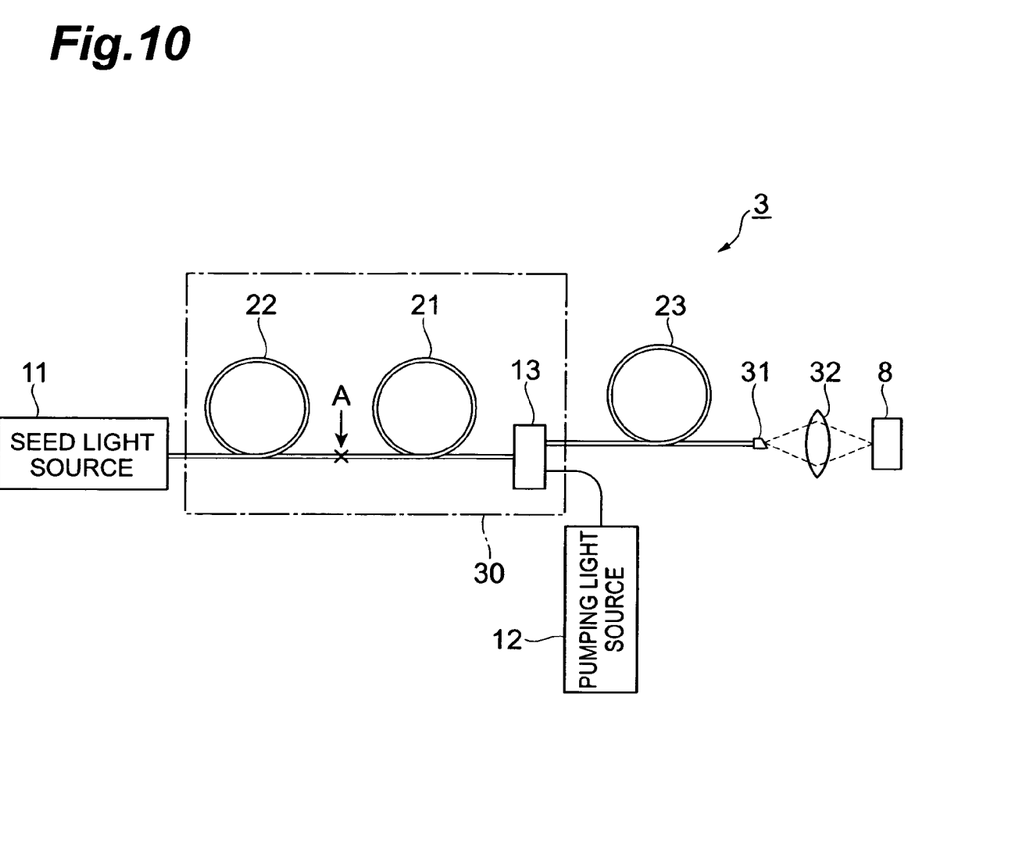
FIG. 10 is a view showing a structure of a third embodiment of the optical module according to the present invention.

Next, a third embodiment of the optical module and processing method according to the present invention will be described. FIG. 10 is a view showing a structure of the third embodiment of the optical module according to the present invention. An optical module 3 shown in FIG. 10 is an optical device for processing the target to be processed 8. The module 3 includes the seed light source 11, the pumping light source 12, the optical coupler 13, the amplification optical fiber 21, the absorption optical fiber 22, the single-mode optical fiber 23, the APC optical connector 31, and the optical system 32. Further, a fiber unit 30 is constituted by the optical coupler 13, the amplification optical fiber 21, the absorption optical fiber 22, and the single-mode optical fiber 23.

As compared to a structure of the optical module 2 according to the second embodiment shown in FIG. 9, the optical module 3 according to the third embodiment shown in FIG. 10 differs from the optical module 2 in the following points: the propagation direction of the light to be amplified and that of the pumping light in the respective amplification optical fiber 21 and absorption optical fiber 22 are opposite to each other; and the optical coupler 13 is provided between the absorption optical fiber 22 and the single-mode optical fiber 23.

In this optical module 3, the pumping light outputted from the pumping light source 12 is inputted to one end of the amplification optical fiber 21 by the optical coupler 13 and propagates in the order from the amplification optical fiber 21 to the absorption optical fiber 22. On the other hand, the seed light (light to be amplified) outputted from the seed light source 11 is inputted to one end of the absorption optical fiber 22 and propagates in the order from the absorption optical fiber 22 to the amplification optical fiber 21.

In the amplification optical fiber 21, the light to be amplified propagates in a single mode through the core 21a and the pumping light propagates in a multimode through the core 21a, the first cladding 21b, and the second cladding 21c. In this amplification optical fiber 21, the amplification dopant doped in the core 21a is excited by the pumping light and the light to be amplified is amplified. Further, the light to be amplified which is amplified in the amplification optical fiber 21 is outputted to the outside via the optical coupler 13, the single-mode optical fiber 23 and the APC optical connector 31, and condensed and irradiated onto the target to be processed 8 by the optical system 32. Thereby, the target to be processed 8 is processed.

The transmitting pumping light which is not absorbed by the amplification dopant in the amplification optical fiber 21 is outputted from the amplification optical fiber 21 to the absorption optical fiber 22. In the absorption optical fiber 22, the transmitting pumping light propagates in a multimode through the core 22a, the first cladding 22b, and the second cladding 22c. In this absorption optical fiber 22, the transmitting pumping light is absorbed by the absorption dopant doped in the second cladding 22c. Accordingly, the power of the transmitting pumping light outputted from the absorption optical fiber 22 to the seed light source 11 is reduced, whereby breakage of the seed light source 11 can be avoided. Further, between the seed light source 11 and the absorption optical fiber 22, an optical isolator is provided and the transmitting pumping light may be cut off by this optical isolator.

In addition, the optical module 3 according to the third embodiment shown in FIG. 10 is not related to the upconversion; further, a guide optical fiber may be provided in place of the single-mode optical fiber 23, or the single-mode optical fiber 23 may not be needed.

Modification Example

The present invention is not limited to the above embodiments, and various modifications are possible. In the above embodiments, the cladding of the absorption optical fiber 22 is doped with Er as the absorption dopant; further, the cladding may be doped with other rare earth elements or transition metal elements. When the cladding of the absorption optical fiber 22 is doped with the transition metal element, the amount of heat generated at the output end of the amplification optical fiber 21 can be thermally distribution-diffused in a longitudinal direction of the absorption optical fiber 22 and therefore, the possibility that only one portion has a high temperature is reduced.

Not only the second cladding 22c of the absorption optical fiber 22 but also the first cladding 22b thereof may be doped with the absorption dopant. However, since the light to be amplified is not only confined in the core to propagate therethrough, but also leaks out to the cladding in a Gaussian distribution profile to propagate therethrough, it is feared that when the first cladding 22b is doped with an element such as a transition metal element as the absorption dopant, the light to be amplified also receives damage. Accordingly, it is preferred that in order to avoid the damage of the light to be amplified, in the absorption optical fiber 22, the first cladding 22b is a non-intentionally doped region and the second cladding 22c is doped with the absorption dopant, as described in the above embodiment.

As described above, according to the present invention, the power of the light to be amplified which is amplified and outputted can be made high, and problems such as damage to other optical parts and heat generation can be reduced.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical module comprising:
   an amplification optical fiber amplifying light to be amplified by supply of pumping light, said amplification optical fiber including:
      a core extending along a predetermined axis and being doped with an amplification dopant for amplifying the light to be amplified;
      a first cladding provided on an outer periphery of said core and having a refractive index lower than that of said core;
      a second cladding provided on an outer periphery of said first cladding and having a refractive index lower than that of said core; and
      a third cladding provided on an outer periphery of said second cladding and having a refractive index lower than those of said first and second claddings, whereby said amplification optical fiber allows light to be amplified to propagate in a single-mode in said core thereof and allows the pumping light to propagate in a multi-mode in said core, said first cladding, and said second cladding thereof;
   an optical coupler optically connected to one end of said amplification optical fiber, said optical coupler supplying at least the pumping light into said amplification optical fiber; and
   an absorption optical fiber optically connected to the other end of said amplification optical fiber and absorbing the pumping light having passed through said amplification optical fiber, said absorption optical fiber including:
      a core extending along a predetermined axis so as to be optically connected to said core of said amplification optical fiber;
      a first cladding provided on an outer periphery of said core of said absorption optical fiber so as to be optically connected to said first cladding of said amplification optical fiber, and having a refractive index lower than that of said core of said absorption optical fiber;
      a second cladding provided on an outer periphery of said first cladding of said absorption optical fiber so as to be optically connected to said second cladding of said amplification optical fiber, and having a refractive index lower than that of said core of said absorption optical fiber, said second cladding of said absorption optical fiber being doped with an absorption dopant for absorbing the pumping light; and
      a third cladding provided on an outer periphery of said second cladding of said absorption optical fiber and having a refractive index lower than those of said first and second claddings of said absorption optical fiber, whereby said absorption optical fiber allows light to be amplified to propagate in a single-mode in said core thereof and allows the pumping light to propagate in a multimode in said core, said first cladding, and said second cladding thereof.

2. An optical module according to claim 1, wherein said first cladding of said amplification optical fiber is a region in which no amplification dopant is intentionally doped.

3. An optical module according to claim 1, wherein the amplification dopant includes Yb and the absorption dopant includes Er.

4. An optical module according to claim 3, wherein an Er doping concentration in said second cladding of said absorption optical fiber is 1000 wt.ppm or more but 8000 wt.ppm or less.

5. An optical module according to claim 1, wherein said core of said absorption optical fiber is comprised of pure silica.

6. An optical module according to claim 1, wherein said first cladding of said absorption optical fiber is a region in which no amplification dopant is intentionally doped.

7. An optical module according to claim 1, wherein said core of said absorption optical fiber is a region in which no absorption dopant is intentionally doped.

8. An optical module according to claim 1, wherein one end of said absorption optical fiber is connected to one end portion, from which the pumping light is outputted, of both end portions of said amplification optical fiber, and
   wherein a single-mode optical fiber is disposed on a propagation path of the light to be amplified having passed through both of said amplification optical fiber and said absorption optical fiber, said single-mode optical fiber including:
      a core allowing the light to be amplified to propagate in a single-mode; and
      a cladding provided on an outer periphery of said core and having a refractive index lower than that of said core, said cladding preventing the pumping light from propagating.

9. An optical module according to claim 1, wherein said first cladding of said absorption optical fiber is doped with the absorption dopant.

10. A method of processing a predetermined target using an optical module according to claim 1, said method comprising the steps of:
   setting the target in a predetermined position;
   supplying the pumping light via said optical coupler into said amplification optical fiber through which the light to be amplified propagates; and
   irradiating the target with amplified light taken out from said optical module via an optical system for condensing the amplified light.

11. A method according to claim 10, wherein said amplification optical fiber and said absorption optical fiber are disposed in sequence along the traveling direction of the light to be amplified, and said optical coupler is disposed to said amplification optical fiber such that the light to be amplified and the pumping light propagate in the same direction; and
   wherein visible light obtained by upconversion of the pumping light in said absorption optical fiber is irradiated onto the target via said optical system.

* * * * *